June 25, 1940.  E. J. HOUDRY  2,205,409
TEMPERATURE CONTROL OF CATALYTIC OPERATIONS
Filed April 23, 1937
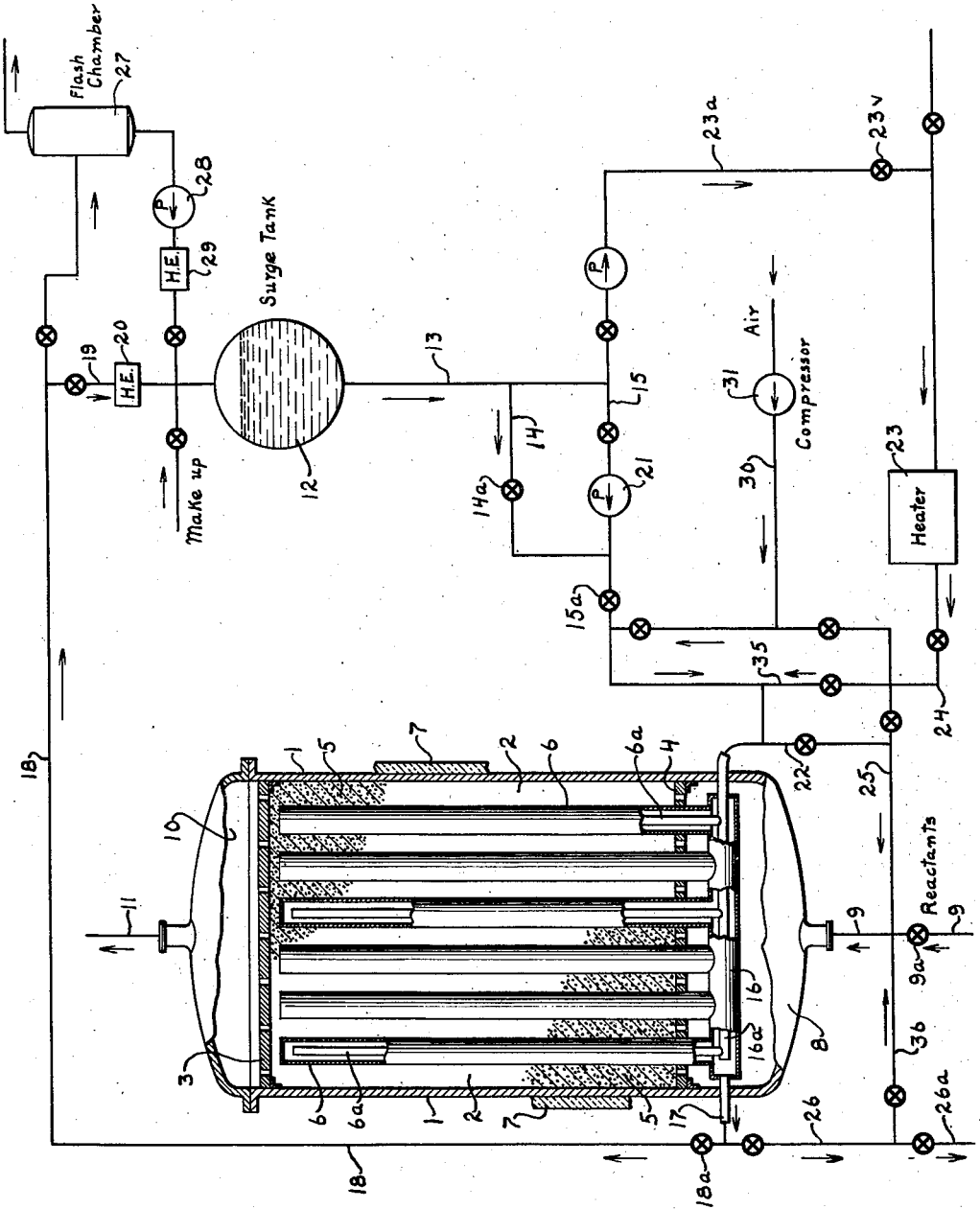
INVENTOR
Eugene J. Houdry
BY
Ira L. Nickerson
ATTORNEY Patented June 25, 1940

2,205,409

UNITED STATES PATENT OFFICE 2,205,409

TEMPERATURE CONTROL OF CATALYTIC OPERATIONS

Eugène J. Houdry, Haverford, Pa., assignor to Houdry Process Corporation, Wilmington, Del., a corporation of Delaware Application April 23, 1937, Serial No. 138,502

9 Claims. (Cl. 196—96)

The present invention relates to treatment of fluids with contact or catalytic material and to the temperature control of such material. It has particular application where the contact material is employed in a cycle of operation, the component parts or steps of which are carried out at substantially different temperatures and/or have dissimilar or widely variant heats of reaction.

While reactants may consist of any of various fluids which it is desired to subject to a contact or catalytic treatment or conversion, they may, for example, consist of hydrocarbons of petroleum, coal, shale or other origin, natural or artificial, or they may consist of or comprise various other fluids, especially (though not necessarily) those which deposit contaminants or combustible materials on the contact material or catalyst during treatment thereof. Again, they may be reactants for the production of alcohols and their derivations or of resins, for example.

The contact material or mass may comprise various materials, depending upon the conditions to be employed and the nature of the reaction desired. Usually an adsorptive material will be used, such as a metalliferous material, e. g. an argillaceous material or a gel-like material or other metal compound or metal. It is often preferable for the contact material to be in the form of bits, fragments, or especially molded pieces of suitable size and shape such, for example, as the molded annular units described in Patent No. 1,837,971, issued on December 22, 1931, to Alfred Joseph, or molded cylindrical units. However, this invention is not to be limited by the illustrations given as to the type or form of the contact or catalytic material.

It is an object of this invention to provide an improved method for controlling the temperature of a catalyst or contact material throughout different phases or steps of a cycle or operation. Another object of this invention is to provide heat economies and other economies in process. A further and salient object of this invention is to provide an advantageously economical cycle of operation and one with improved control of the temperature of the contact material during transition from one period of the cycle to another. The above, as well as other objects and advantages, will appear from the specification taken as a whole.

For a quick understanding of an illustrative embodiment and an exemplary adaptation of my invention, reference may be had to the accompanying drawing, the single figure of which is somewhat diagrammatic in character but shows a converter or casing 1 in vertical section. The converter provides a reaction chamber 2 bounded by upper and lower partition members 3 and 4. Catalytic or contact material 5 of any suitable or desired type, such as an adsorptive blend or compound of silica and alumina in the form of cylindrical units or pellets, substantially fills the reaction chamber, around heat exchange members or conduits 6 extending therewithin. A layer of insulation 7 surrounds the converter.

For the sake of specific illustration, the reactant charge to be treated will be considered as hydrocarbons subjected to treatment or conversion at temperatures substantially below those of regeneration by oxidation.

In this type of an operation there are four periods in the cycle of operation, as follows: (1) On-stream or reaction period at relatively low temperatures, for example at temperatures not exceeding 700° F.; (2) Heating-up period; (3) Regeneration period at relatively high temperature, for example 900° F. and above; and (4) Cooling-down period. The last-mentioned period just precedes another on-stream or reaction period.

The hydrocarbon reactants may be passed into manifolding chamber 8 through line 9 controlled by valve 9a. From the manifolding chamber the reactants pass through perforations or openings in partition member 4 directly into contact with contact material or catalyst 5 and pass upwardly therethrough, leaving the reaction chamber in a transformed or converted state through perforations or openings in partition member 3, and entering the manifolding chamber 10. From manifolding chamber 10 the products of reaction, consisting to an important extent of gasoline, for example, may be led to storage, further treated or removed for other purpose through line 11.

During this passage of hydrocarbon reactants, which may be termed as the on-stream operation or on-stream step, a heat exchange fluid is circulated through tubes 6 having inner tubes or inserts 6a. The reaction may be endothermic or exothermic in character and the heat exchange fluid will be circulated at temperatures somewhat above or below the temperature which it is desired to maintain in the reaction chamber 2, thereby to add or withdraw heat of reaction and to maintain the mass within the desired range. In most instances the heat exchange fluid is utilized at temperatures from 50° to 150° F. above or below that of the reaction.

Any suitable heat exchange fluid may be used whether gaseous or liquid. It may be a fused salt, fused metal or metal alloy of high vaporization point, or other material which is substantially unvaporizable at the temperatures employed, or it may consist of vaporizable materials such as water, mercury, diphenyl or the like. By way of illustration, we shall consider the heat exchange fluid to be water in the particular operation being described. This heat exchange fluid will pass from surge tank 12 through line 13 and then through branch 14 and/or 15 and thence through the lines shown into inner tubular member 16a of manifold 16. The heat exchange fluid then passes upwardly through inner tubes 6a and then downwardly through the annular spaces between inner tubes or inserts 6a and tubes 6 into the chamber of the heat exchange manifold between 16 and 16a. Thence the heat exchange fluid is withdrawn from the manifold through line 17 and may be returned through line 18, branch line 19 and heat exchanger 20 back into surge tank 12, or it may be passed from line 18 into flash chamber 27, where the vapors are removed as overhead, and the liquid may be returned by pump 28 through heat exchanger 29 into tank 12.

Heat exchangers 20 and 29 may each be of any desired type and may transfer heat to any desired fluid, and serve to adjust the temperature of the heat exchange fluid or water to that desired for recirculation in a plurality of channels through reaction chamber 2, as through heat exchange tubes or passages imbedded in the mass. Pump 21 in line 15 is employed to cause the heat exchange fluid to circulate at the rate desired.

At the end of the on-stream period it is often necessary to bring the mass 5 or a portion thereof to a higher temperature than is employed during the on-stream operation, for example, to a temperature of the order of 800° F. or to a temperature approaching that level before it is possible to carry out a regeneration with an oxygen-containing regenerating medium. That is, a heating up period must be employed. The cooling fluid heretofore used may be drained from the tubes 6 and manifold 16 through lines 26 and 26a, after valves 18a and 15a have been closed. Draining is necessary or desirable when different heat exchange media are used in the successive operations. A heat-carrying fluid such as superheated steam is then sent into manifolding chamber 8 and directly up through the contact mass, and/or through tubes 6a and 6 and then into the manifolding chamber 8 and up through the contact mass. The steam or the like will serve the dual function of heating up the mass and purging it of hydrocarbons or other on-stream reactants prior to passing regenerating medium thereinto. The heat-carrying fluid may be obtained from heater 23, the charge thereto being supplied from an outside source or through line 23a controlled by valve 23V. The heat-carrying fluid is sent through line 24 and then passed through branch line 25 and line 9 into manifolding chamber 8 or through line 35 into the inner member 16a of heat exchange manifold 16. When it is desired to pass some of the heat carrying fluid first through the heat exchange tubes 6 and then directly into contact with the mass, the fluid, after passing through the tubes 6, may be withdrawn from the heat exchange manifold through line 17 and returned through lines 26, 36 and 9 into the manifolding chamber.

It is usually preferable, however, in the type of operation being considered to pass at least a major portion of the steam directly from the heater 23 into the manifolding chamber 8. When this is done and a lower layer of the contact material, e. g., a depth of several inches directly above partition member 4, becomes heated to a temperature at which the addition of air or other oxygen-containing regenerating medium will initiate vigorous burning, for example, at a temperature of the order of 800° F., some air, or the like, can then be substituted for all or a part of steam. At the time when the air is first introduced into the contact material, the main portion of the heating up period may be considered to be over, in spite of the fact that the upper portions of the bed or body of contact material still have to be raised to a suitable regeneration temperature. That is, from this point on, the regeneration itself will generate sufficient heat to bring the remaining proportions of the mass up to suitable regeneration temperature. However, it is usually desirable to dilute the oxidizing medium to control the burning and to prevent the temperature of the mass 5 from rising too high. Where the regenerating medium is air, the nitrogen of the air supplies a portion of the required inert medium and this may be supplemented by other gaseous material such as steam or flue gas.

The regenerating medium, moreover, is used as a heat exchange medium by sending it, or at least a portion thereof first through the heat exchange system comprising tubes 6 and 6a, before it enters the contact mass, for the dual purpose of removing heat from all portions of the reaction chamber and of preheating the regenerating medium sufficiently to avoid chilling the mass and thus stopping the burning. The preheated regenerating medium passes through lines 17, 26, 36 and 9 to the manifolding chamber 8, whence it passes upwardly through the contact mass and leaves the reaction chamber through perforated partition member 3 and manifolding chamber 10. As regeneration continues the lower layers of the contact material will become completely regenerated first and regeneration of the mass will progress upwardly through the converter.

When the regeneration of the mass is complete, or substantially complete, as will be evident, for example, from a rough analysis of the gases or fumes of regeneration leaving the converter through line 11, the cooling-downstep is commenced. It is necessary to bring the temperature of the mass from that employed in regeneration down to the on-stream level before the on-stream step can be again proceeded with. Cooling down may be accomplished by circulating fluid from surge tank 12 through the lines shown and the heat exchange tubes 6a and 6, first, of course, making the necessary valve adjustments. This cooling action may be supplemented by passing fluid, such as low temperature steam and/or air directly through the mass for a period of time.

Among the on-stream operations for which the invention may be employed are refining of hydrocarbon fractions in vapor or liquid phase at temperatures up to about 700° F., by the action of suitable catalysts, including adsorptive silicious masses and blends or compounds of silica and alumina with or without the addition of other active ingredients.

Again the invention may be applied in the case of catalytic polymerizing operations carried out in liquid, vapor or mixed phase, e. g. within the temperature range of 50° to 700° F., employing pressures of any desired order.

Where a regenerating medium, such as an oxygen-containing or other gas, is passed through the contact materials or catalysts in alternate periods of regeneration, the contact material being maintained above a temperature of approximately 800° F. during regeneration, it will be seen that the on-stream and regeneration temperatures are quite different and that steps of temperature adjustment, for example as above described, must both proceed and follow each regeneration period.

The above uses of my invention are given only by way of illustration. It will be obvious that my invention is applicable in many other treating or transforming operations involving the use of a contact or catalytic mass where the mass is employed in a cycle of operation, especially where the separate periods thereof are conducted at substantially different temperatures.

To prevent injury to the apparatus described above, when the cooling down period is being initiated, relatively cold fluid which is to be passed into the heat exchange tubes 6a and 6, is introduced very gradually. When surge tank 12 is at or above the level of the tops of the tubes 6, then the passage of fluid into tubes 6 may be effected by gravity without putting pump 21 into action, as merely by controlling valve 14a in line 14.

According to this operation, heat exchange fluids of different kinds are passed through the same heat exchange system during the on-stream periods and the subsequent regeneration periods, and permissibly during the intervening transition periods. During regeneration periods and permissibly during transition periods subsequent thereto, cool air, or other suitable fluid, and/or water or steam or equivalent inert diluent, may be passed through these same heat exchange tubes or passages and then through the contact material to be regenerated. Much auxiliary heat exchange equipment is thereby eliminated and a compact plant, having a high efficiency in the utilization and conservation of heat, is provided.

Where any readily vaporizable fluid is employed for controlling the mass at desired temperature during the on-stream period, for example, water, mercury or diphenyl, it is often desirable to separate vapors from the heat exchange fluid leaving the converter before return of the same to surge tank 12. Accordingly, heat exchange fluid passing through line 18 may be passed to flash chamber 27 to remove the vapors and then the liquids will be returned by pump 28 through heat exchanger 29 back to the surge tank 12. The vapors passing overhead from flash chamber 27, after utilization for any desired purpose, may be returned as condensate to the surge tank 12, if desired, by lines not shown. Where a heat exchange fluid is used which does not change state, there is no need of employing flash chamber 27 or the like.

As will be apparent from the drawing, during regeneration, air, other oxygen-containing gas or other regenerating medium, will be supplied through line 30 by compressor 31 and, by proper adjustment of the valves shown, may be passed through the lines shown wholly to member 16a of heat exchange manifold 16 or partly to 16a and partly directly to manifold 8. Where there is an aqueous fluid in surge tank 12, the same may be supplied to heater 23 through line 23a controlled by valve 23V, when desired.

While the converter shown involves a straight-through flow of reactants within the reaction or catalytic chamber, it is to be understood that this invention is also applicable where there are other types of flow of reactant fluid through a contact mass, for example the parallel flow arrangement involving the uniform distribution of reactant fluid and collection of fluid products of reaction as illustrated, for example, in Patent No. 2,042,468, issued to me on June 2, 1936. To improve heat transfer to and from the heat exchange media sent through conduits 6, the latter may have heat conducting members or fins extending or radiating into contact mass 5 as indicated, for example, in Patent No. 1,987,905, issued to me on January 15, 1935.

While the invention has been illustrated in connection with certain catalysts, reactions and reactants, it will, nevertheless, be understood that this exemplary discussion is not to be taken by way of limitation and the invention is applicable to the treatment of various other fluids and the production of various products, whether or not the same or different types of catalysts are employed. In general, the invention has its major utility in the type of case where a contact material or catalyst is employed in a cycle of operation involving two or more periods, each of which is conducted at different temperatures, for example, one of such periods being endothermic or slightly exothermic and the other being strongly exothermic. The problem of carrying out operations of this type, while minimizing the costs of heat and heat exchange and other features of process and at the same time doing this without necessitating an unduly expensive apparatus, has been a problem which presented great difficulties and it is to this problem, along with that of maintaining a high proportion of the cycle of operation productive, that the present invention is directed.

What I claim is:

1. In the treatment or transformation of fluid reactants in the presence of a bed or body of contact or catalytic material involving a cycle of operation comprising alternate on-stream and regenerating reactions, the regenerating reaction being effected at a higher temperature than the on-stream reaction, the steps of process which comprise passing a heat exchange fluid through confined heat exchange passages within said body of contact material and out of direct contact with the latter during one reaction step, while passing fluid reactants directly through and in contact with said contact material, and during the other reaction step passing reactant fluid through said confined heat exchange passages and then through and in contact with said contact material.

2. In the treatment of fluid reactants in the presence of contact material, involving a cycle of operation including separate periods or steps, each of which is carried out at a temperature substantially different from the other, the steps of process which comprise passing fluid reactants through said mass while simultaneously passing a heat exchange fluid through heat exchange passages distributed within said mass during the lower temperature period of the cycle of operation; after a period of operation, stopping the flow of the aforementioned fluids and adjusting the temperature of said mass to that desired for an alternate, higher temperature period of operation and then passing different reactant fluid first through the aforesaid heat exchange passages and then through said mass, so as to control the temperature of the last-mentioned fluid before it contacts said mass and to maintain said mass within the temperature range desired for said alternate period; subsequent to the period just defined, returning said mass to the temperature range of the first-mentioned or lower temperature step of operation by circulating fluid in heat exchange with said mass and through said heat exchange passages.

3. In the treatment of fluid reactants in the presence of contact material wherein the contact mass is subjected alternately to on-stream and regeneration reactions, each having different heats of reaction from the other, the steps of process which comprise passing reactants through said mass, simultaneously with the last-mentioned step passing heat exchange fluid through heat exchange passages distributed within said mass so that said mass is controlled at the desired reaction temperature but is not contacted by said heat exchange fluid; stopping the flow of fluid reactants to said mass after a period of operation on stream; passing at least a portion of the fluid regenerating medium first through the aforesaid heat exchange passages and then into and through the mass so as to maintain said mass at desired regeneration temperature; and repeating the above steps after regeneration is completed.

4. In the treatment of hydrocarbon fluid reactants in the presence of contact material wherein the contact mass is subjected alternately to on-stream and regeneration reactions, each being carried out under substantially different conditions of operation, the steps of process which comprise passing hydrocarbon reactants through said mass, simultaneously with the last-mentioned step passing heat exchange fluid through heat exchange passages distributed within said mass, so that said heat exchange fluid does not come into contact with said mass; stopping the flow of reactants to said mass after a period of operation on stream and adjusting the temperature of said mass to that desired for initiating regeneration; passing fluid regenerating medium to said mass, at least a portion of said medium first passing through the aforesaid heat exchange passages; when regeneration of said mass is sufficiently complete, returning said mass to the desired on-stream temperature.

5. In the polymerization of low boiling hydrocarbons to produce higher boiling hydrocarbons within the gasoline boiling range in the presence of catalytic material adapted periodically to be regenerated in situ, the steps of process in controlling the temperature of the catalytic material which comprise passing said low boiling hydrocarbons through said mass while simultaneously passing heat exchange fluid through heat exchange passages distributed within said mass so as to maintain said mass at a desired reaction temperature below 700° F.; stopping the flow of hydrocarbon reactants to said mass after a period of operation on stream and increasing the temperature of said mass; then passing an oxygen-containing regenerating medium first through the aforesaid heat exchange passages and then through said mass so as to control the temperature of said mass during regeneration while suitably adjusting the temperature of said regenerating medium prior to its coming into contact with said mass; when regeneration of said mass is substantially complete, stopping the passage of regenerating medium into said mass and passing heat exchange fluid through said heat exchange passages to cool said mass down to a suitable temperature before again admitting the on-stream reactant.

6. In the treatment of hydrocarbon fluid reactants in the presence of contact material wherein the contact mass is subjected alternately to on-stream and regeneration reactions, the on-stream or transformation step being carried out at a substantially lower temperature than the regeneration step, the steps of process which comprise passing hydrocarbon reactants through said mass, simultaneously with the last-mentioned step passing heat exchange fluid through heat exchange passages distributed within said mass, but out of contact with said mass, so as to maintain said mass within the desired reaction temperature range; stopping the flow of hydrocarbon reactants to said mass after a period of operation on stream, passing an extraneous fluid medium through said mass to raise its temperature to a level at which regeneration can be initiated, then passing regenerating medium first through the aforesaid heat exchange passages and then through and in contact with said mass, thereby to control the temperature of the regenerating medium and to remove exothermic heat of regeneration; when regeneration of said mass is substantially complete, stopping the flow of regenerating medium through the aforesaid heat exchange passages and again passing heat exchange fluid therethrough as aforesaid so as to bring the temperature of said mass within a range suitable for initiating the on-stream reaction or transformation.

7. In the treatment of low boiling hydrocarbons to produce higher boiling hydrocarbons within the gasoline boiling range in the presence of catalytic material adapted periodically to be regenerated in situ, the steps of process in controlling the temperature of the contact material which comprise passing said lower boiling hydrocarbons through said mass while simultaneously passing heat exchange fluid through heat exchange passages distributed within said mass so as to maintain said mass at a desired reaction temperature below 700° F.; stopping the flow of hydrocarbon reactants to said mass after a period of operation on stream and passing steam through said heat exchange passages and then through said mass to raise the same to a temperature of the order of 800° F.; then passing an oxygen-containing regenerating medium first through the aforesaid heat exchange passages and then through said mass so as to control the temperature of said mass during regeneration while suitably adjusting the temperature of said regenerating medium prior to its coming into contact with said mass; when regeneration of said mass is substantially complete, stopping the passage of regenerating medium into said mass and passing heat exchange fluid through said heat exchange passages to cool said mass down to a suitable temperature for treating low boiling hydrocarbons on-stream.

8. Process as defined in claim 5 in which the heat exchange fluid is a molten material from the group consisting of metals, salts and the like which are liquid at the temperature at which it is desired to circulate said heat exchange fluid in heat exchange with said mass and in which aqueous fluid is employed in raising the temperature of said mass following the on-stream step and preliminary to regeneration and is also employed as a heat absorbing medium, along with an oxygen-containing gas, during regeneration.

9. In the treatment of low boiling hydrocarbon fluid reactants in the presence of contact material, wherein the contact material is subjected alternately to on-stream and regeneration reactions, the steps of passing the low boiling hydrocarbons through the contact material while simultaneously passing heat exchange fluid through heat exchange passageways in indirect heat exchange relation with the mass so as to maintain the contact material at a reaction temperature below 700° F., stopping the flow of hydrocarbon reactants to the contact material and admitting steam thereto to raise the contact material to a temperature in the neighborhood of 800° F., passing an oxygen-containing regenerating medium through the heat exchange passageways in order to adjust the temperature thereof and then passing the medium into contact with the material, stopping the passage of the regenerating medium into the material and again passing heat exchange fluid through the heat exchange passageways to withdraw heat and adjust the temperature of the material to a temperature below 700° F.

EUGÈNE J. HOUDRY.